US009219999B2

(12) United States Patent
Peng et al.

(10) Patent No.: US 9,219,999 B2
(45) Date of Patent: Dec. 22, 2015

(54) INFORMATION PUSH METHOD, APPARATUS, AND SYSTEM

(71) Applicant: Huawei Technologies Co., Ltd., Shenzhen (CN)

(72) Inventors: Chenghui Peng, Shanghai (CN); Yuhua Chen, Shanghai (CN); Wei Zhang, Shanghai (CN); Bojie Li, Shanghai (CN); Qiyong Zhao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 451 days.

(21) Appl. No.: 13/735,818

(22) Filed: Jan. 7, 2013

(65) Prior Publication Data

US 2013/0121252 A1    May 16, 2013

Related U.S. Application Data

(63) Continuation of application No. PCT/CN2011/075102, filed on Jun. 1, 2011.

(30) Foreign Application Priority Data

Jul. 6, 2010  (CN) .......................... 2010 1 0224328

(51) Int. Cl.
*H04L 12/28* (2006.01)
*H04W 4/12* (2009.01)
*H04L 29/12* (2006.01)
*H04L 29/08* (2006.01)
*H04L 12/26* (2006.01)

(52) U.S. Cl.
CPC ............... *H04W 4/12* (2013.01); *H04L 61/106* (2013.01); *H04L 61/256* (2013.01); *H04L 61/6054* (2013.01); *H04L 67/26* (2013.01); *H04L 43/10* (2013.01); *Y02B 60/46* (2013.01)

(58) Field of Classification Search
CPC ..... H04W 4/12; H04L 61/256; H04L 61/106; H04L 67/26; H04L 61/6054; H04L 43/10; Y02B 60/46
USPC .................................. 370/389, 349, 353–357
See application file for complete search history.

(56) References Cited

U.S. PATENT DOCUMENTS

| 7,426,203 | B1 | 9/2008 | McNamara et al. |
| 2002/0138622 | A1 | 9/2002 | Dorenbosch et al. |
| 2005/0235046 | A1 | 10/2005 | Carpenter |
| 2006/0109827 | A1 | 5/2006 | Zhang |

FOREIGN PATENT DOCUMENTS

| CN | 1567846 A | * | 1/2005 | .............. H04L 29/06 |
| CN | 1585372 A | | 2/2005 | |

(Continued)

OTHER PUBLICATIONS

Foreign Communication From a Counterpart Application, Chinese Application No. 201010224328.3, Chinese Office Action dated May 2, 2013, 6 pages.

(Continued)

*Primary Examiner* — Brenda H Pham
(74) *Attorney, Agent, or Firm* — Conley Rose, P.C.; Grant Rodolph; Adam J. Stegge

(57) ABSTRACT

The present invention provides a new Push method, apparatus, and system. The Push method includes: receiving a Push message delivered by an application server; obtaining a private IP address of a UE according to a user identifier, where the user identifier is obtained from the Push message; and obtaining, according to the private IP address of the UE, a PS domain node currently connected to the UE, sending the Push message to the PS domain node, and sending the Push message to the UE through the PS domain node.

15 Claims, 15 Drawing Sheets

(56) References Cited

FOREIGN PATENT DOCUMENTS

| | | |
|---|---|---|
| CN | 1839611 A | 9/2006 |
| CN | 101277311 A | 10/2008 |
| DE | 10361949 A1 | 8/2005 |
| WO | 03019973 A2 | 3/2003 |

OTHER PUBLICATIONS

Foreign Communication From a Counterpart Application, Chinese Application No. 201010224328.3, Partial English Translation of Chinese Office Action dated May 2, 2013, 8 pages.

Foreign Communication from a Related Application, PCT Application PCT/CN2011/075102, English Translation International Search Report dated Sep. 8, 2011, 2 pages.

Foreign Communication From a Related Counterpart Application, PCT Application PCT/CN2011/075102, English Translation of Written Opinion dated Sep. 8, 2011, 7 pages.

"3rd Generation Partnership Project; Technical Specification Group Services and System Aspects; Support of Push Service (Release 5)," 3GPP TR 23.875 V5.1.0, Mar. 1, 2002, 70 pages.

Foreign Communication From a Counterpart Application, European Application No. 11783051.3, Extended European Search Report dated Apr. 29, 2013, 9 pages.

\* cited by examiner

INFORMATION PUSH METHOD, APPARATUS, AND SYSTEM

CROSS-REFERENCE TO RELATED APPLICATIONS

This application is a continuation of International Application No. PCT/CN2011/075102, filed on Jun. 1, 2011, which claims priority to Chinese Patent Application No. 201010224328.3, filed on Jul. 6, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to the wireless communication field, and in particular, to a method for implementing an information push on a wireless network, and specifically, to a method, an apparatus, and a system for pushing wireless network information.

BACKGROUND

Apple Inc. launches a Push Notification solution, which is applicable to an iPhone. A Push manner is adopted in the solution. When an application of a user has an incoming event (for example, a new email is received in Email), the event is directly pushed to a client, and the client does not need to keep the application online, or periodically log into an application server to check whether a new event occurs. Essence of a Push technology is to let information find a user actively. An advantage lies in activeness and timeliness of information. By using this technology, information may be pushed to a user as quickly as possible.

A working mechanism of the Push Notification solution may be briefly shown in FIG. 1, where:

A Provider refers to an application server of a certain piece of iPhone software. An APNS is an acronym of an Apple Push Notification Service (Apple Push server), and this acronym is used in the following.

An entire working process is as follows:

1. An application server (Provider) packetizes a message to be sent and a destination iPhone identifier (notification), and sends to an APNS. That is, an application server (Provider) packetizes a message to be sent and a destination iPhone identifier into a notification, and sends the notification to an APNS.

2. The APNS searches for an iPhone with a corresponding identifier in a local list of iPhones that have registered a Push service, and sends the message to the iPhone.

3. The iPhone transfers the incoming message to a corresponding application (Client APP), and pops up a Push notification according to setting.

The APNS uses a "destination iPhone identifier" as a basis for determining an iPhone to which a Push message is sent, and the identifier is a device token. 1. After accessing a network, an iPhone connects to an APNS to set up a connection; 2. after the connection is completed, the APNS returns a device token to the iPhone; 3-4. when the iPhone accesses an application service, an application client sends the token to an application server (Provider). Subsequently, the application server may find a user through the APNS and the token. That is, when there is a Push message to be sent, the application server (Provider) sends a device token of a corresponding account and the message to the APNS, and the APNS finds a corresponding destination iPhone according to the device token, and sends the corresponding Push message. The foregoing process is as shown in FIG. 2.

Because a NAT and a firewall exist between the APNS and a terminal, as shown in FIG. 3, heartbeats need to be maintained between the APNS (Apple Push server) and the terminal to maintain reachability of an IP link.

After a UE accesses a network, a GGSN allocates a private IP address to the UE. However, when the UE communicates with the outside, the private IP address needs to be translated into a public IP address through the NAT. That is, the UE's IP address visible to an external network element (including the APNS) is actually the public IP address of the UE.

To receive the Push message, the UE interacts with the APNS, and registers correspondence between a used token and a public IP address at the APNS. Afterward, a user-level heartbeat connection is maintained between the APNS and the UE to maintain reachability of the IP address of the user.

Because a user address visible to the APNS is a public IP address, but there is a time limit for a binding relationship between a public IP address and a private IP address of a terminal under a NAT mechanism. With aging of the NAT after a time period, the public IP address or the private IP address of the terminal changes, which leads to cancellation of the original binding relationship between the public IP address and the private IP address. To ensure that the terminal's public IP address registered at the APNS is valid, aging of the NAT needs to be prevented.

The inventor of the present invention finds that the prior art has at least the following obvious problems:

In the solution, an IP connection needs to be maintained through heartbeats between the APNS and the UE. Signaling messages generated by plenty of heartbeat signals lead to network congestion, and in order to maintain the heartbeats, the UE cannot enter an idle state, which causes high power consumption of the UE.

Further, the foregoing prior art is applicable only in a case that the UE obtains the public IP address, and for a case that the UE does not obtain the public IP address, the foregoing prior art cannot provide the Push service.

SUMMARY

The present invention provides a new Push method, apparatus and system, which can implement that no heartbeat mechanism is needed between a UE and a Push server/application server, provide timeliness and reliability of a Push message, and solve an information push problem in a wireless environment.

To fulfill the foregoing objectives, an embodiment of the present invention provides a new Push system architecture, including an application server, a Push client, a Push server, and a PS domain node, where: the application server is a server configured to provide a specific application service and send a Push message; the Push client is configured to run Push client software, initiate Push registration with a Push server, and when receiving the Push message sent by the application server, make a corresponding response according to presetting; the Push server is configured to determine, according to stored information of a user identifier, an application identifier, a mapping between the user identifier and a private IP address of a UE, and a mapping between the user identifier and a user IMSI, a corresponding PS domain node for the Push message sent by the application server, and send the Push message to the PS domain node; and the PS domain node is configured to provide a service of connecting the UE to the Push server, and send the Push message to the UE.

An embodiment of the present invention further provides an information push method, including: receiving a Push message delivered by an application server; obtaining a private IP address of a UE according to a user identifier, where the user identifier is obtained from the Push message; and obtaining, according to the private IP address of the UE, a first PS domain node currently connected to the UE, sending the Push message to the first PS domain node, and sending the Push message to the UE through the first PS domain node.

An embodiment of the present invention further provides an information push method, including: receiving a Push message delivered by an application server; obtaining a user IMSI according to a user identifier, where the user identifier is obtained from the Push message; and selecting a first PS domain node according to the user IMSI, sending the Push message and the IMSI to the first PS domain node, and sending the Push message to a UE through the first PS domain node.

An embodiment of the present invention further provides a data packet processing method, including: receiving, by a first PS domain node, a data packet, where the data packet includes a Push message and an IMSI; sending, by the first PS domain node, a query message that includes the IMSI to a server that stores user information, and obtaining returned information, where the returned information includes an address of a second PS domain node and a reason for terminal unreachability; sending, by the first PS domain node, a PDU Notification Request message to the second PS domain node, where the PDU Notification Request message is used by the second PS domain node to send a Request PDP Context Activation message to a UE, and the Request PDP Context Activation message is used by the UE to initiate a PDP Context activation process and generate an available PDP Context; and sending, by the first PS domain node, the received data packet to the UE by using the PDP Context.

Further, an embodiment of the present invention further provides a Push server apparatus, including: a first interacting unit, configured to receive a Push message delivered by an application server; a route searching unit, configured to: obtain a private IP address of a user equipment UE according to a user identifier, where the user identifier is obtained from the Push message; obtain, according to the private IP address of the UE, a first packet switched (PS) domain node currently connected to the UE, and send the Push message to the first PS domain node, so that the Push message is sent to the UE through the first PS domain node; and a second interacting unit, configured to forward the Push message delivered by the application server to the corresponding first PS domain node, where the first PS domain node is determined by the route searching unit.

An embodiment of the present invention further provides a Push server apparatus, including: a first interacting unit, configured to receive a Push message delivered by an application server; a route searching unit, configured to: obtain a user IMSI according to a user identifier, where the user identifier is obtained from the Push message; select a first PS domain node according to the user IMSI, and send the Push message and the IMSI to the first PS domain node, so that the Push message is sent to a UE through the first PS domain node; and a second interacting unit, configured to forward the Push message delivered by the application server to the corresponding first PS domain node, where the first PS domain node is determined by the route searching unit.

An embodiment of the present invention further provides a first PS domain node apparatus, including: a first interacting unit, configured to receive a data packet, where the data packet includes a Push message and an IMSI; a querying unit, configured to send a query message that includes the IMSI to a server that stores user information, and obtain returned information, where the returned information includes an address of a second PS domain node and a reason for terminal unreachability; a routing unit, configured to: send a PDU Notification Request message to the second PS domain node, where the PDU Notification Request message is used by the second PS domain node to send a Request PDP Context Activation message to a UE, and the Request PDP Context Activation message is used by the UE to initiate a PDP Context activation process and generate an available PDP Context; and a second interacting unit, configured to send the received data packet to the UE by using the PDP Context.

According to the embodiments of the present invention, after completing the Push registration, the Push client on the UE may be disconnected from the Push server, which avoids a heartbeat connection required by a traditional Push service and a change of an existing NAT mechanism; it is not required that the application client on the UE is online all the time, but the UE is found through the PS domain node and the Push message is sent to the UE, thereby ensuring that the user is always reachable to the Push message, saving network resources and reducing UE power consumption, and lightening a signaling load of a network side.

BRIEF DESCRIPTION OF THE DRAWINGS

To illustrate the technical solutions in the embodiments of the present invention or in the prior art more clearly, accompanying drawings required for describing the embodiments or the prior art are briefly introduced in the following. Apparently, the accompanying drawings in the following description are only some embodiments of the present invention, and persons of ordinary skill in the art may further obtain other drawings according to the accompanying drawings without creative efforts.

DETAILED DESCRIPTION

The technical solutions in the embodiments of the present invention are described clearly and completely in the following with reference to the accompanying drawings in the embodiments of the present invention. Evidently, the embodiments to be described are only part of rather than all of the embodiments of the present invention. All other embodiments obtained by persons of ordinary skill in the art based on the embodiments of the present invention without creative efforts shall fall within the protection scope of the present invention.

Terminologies used in the present invention are as follows:

| Term | English Meaning | Chinese Meaning |
|---|---|---|
| Push | Push | 推送 |
| C/S | client/server | 客户端服务器 |
| IP | Internet Protocol | 互联网协议 |
| IPv4 | Internet Protocol version 4 | 互联网协议版本4 |
| UMTS | Universal Mobile Telecommunications System | 通用移动通信系统 |
| UE | User Equipment | 用户设备,用户终端 |
| GGSN | Gateway GPRS Support Node | 网关GPRS支持节点 |
| SGSN | Serving GPRS Support Node | 服务GPRS支持节点 |
| GPRS | General Packet Radio Service | 通用分组无线服务技术 |
| NAT | Network Address Translation | 网络地址转换 |
| Firewall | / | 防火墙 |
| APNS | Apple Push Notification Service | Apple Push通知服务 |
| PS | Packet Switched | 分组交换 |
| CS | Circuit Switched | 电路交换 |
| PLMN | Public Land Mobile-communication Network | 公共陆地移动通信网 |
| HPLMN | Home PLMN | 家乡PLMN |
| VPLMN | Visited PLMN | 拜访地PLMN |
| PDP | Packet Data Protocol | 分组数据协议 |
| MS | Mobile Station | 移动台,移动终端它与UE同义 |
| HLR | Home Location Register | 归属位置寄存器 |
| HSS | Home Subscriber Server | 归属用户服务器 |
| AAA | Authenticaiton Authorization Accounting | 认证授权与计费 |
| PDU | Protocol Data Unit | 协议数据单元 |
| SRI | Send Routing Info | 发送路由信息 |
| APN | Access Point Name | 接入点名称 |
| P-GW | PDN Gateway | PDN网关 |
| PDN | Packet Data Network | 分组数据网络 |
| HA | Home Agent | 家乡代理 |
| 3GPP2 | 3rd Generation Partnership Project 2 | 第三代合作伙伴计划2 |
| WiMAX | World Interoperability for Microwave Access | 全球微波接入互操作性 |
| ASN GW | Access Service Network Gateway | 接入服务网网关 |
| PDSN | Packet Data Serving Node | 分组数据服务节点 |
| IMSI | international mobile subscriber identity | 国际移动用户标识 |
| SMSC | Short Message Service Centre | 短消息服务中心 |
| S-GW | Serving Gateway | 服务网关 |
| MME | Mobility Management Entity | 移动管理实体 |

It should be noted that, the Push in the embodiments of the present invention is not limited to a push service well known currently. Technologies disclosed in the embodiments of the present invention are applicable to all kinds of application scenarios and services in which communication oriented to a terminal user is supported and a terminal route is always kept reachable, so that an application server can send a message to the terminal user actively. Similarly, scopes covered by words and expressions such as Push service, Push server, Push message, and Push system architecture in the embodiments of the present invention are consistent with that covered by the Push in the foregoing explanation.

Embodiment 1

Figure 1:
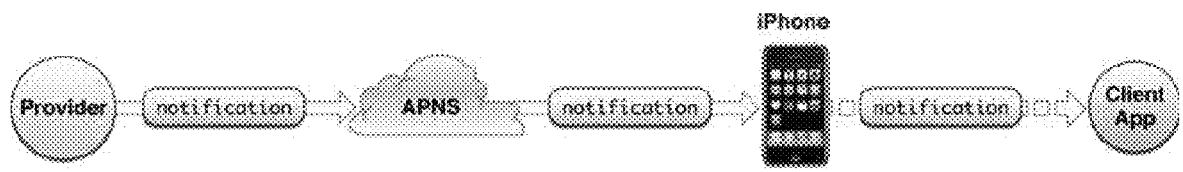
FIG. 1 is a schematic diagram of a working mechanism of Push Notification in the prior art.
Figure 2:
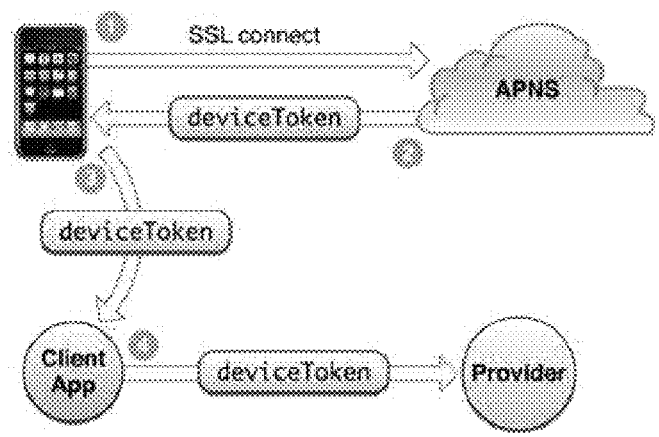
FIG. 2 is a schematic diagram of a working procedure of Push Notification in the prior art.
Figure 3:
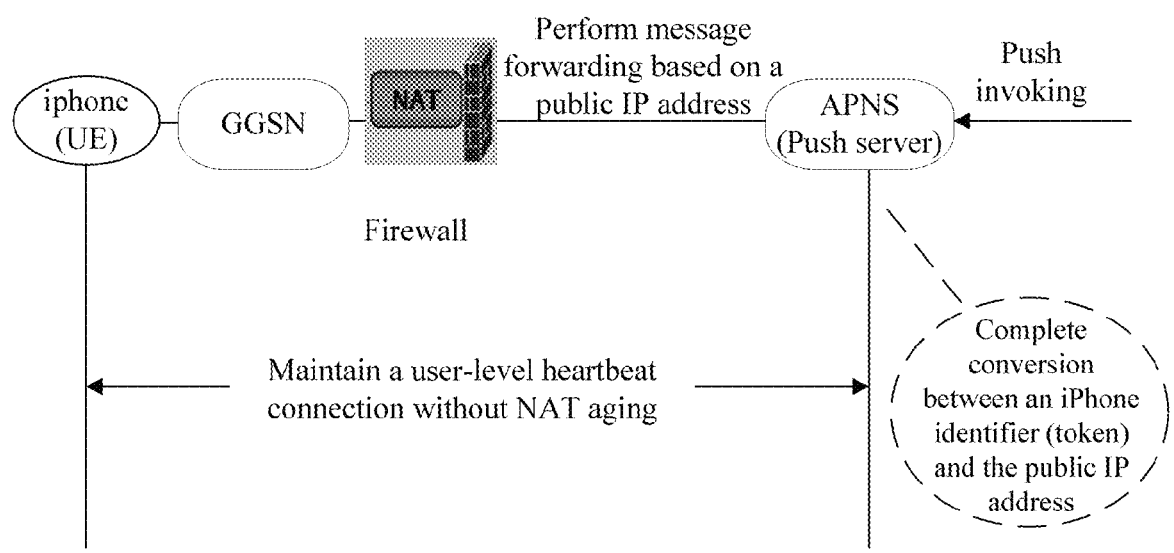
FIG. 3 is a schematic diagram of a working mechanism of maintaining a heartbeat between an APNS and a UE in the prior art.
Figure 4:
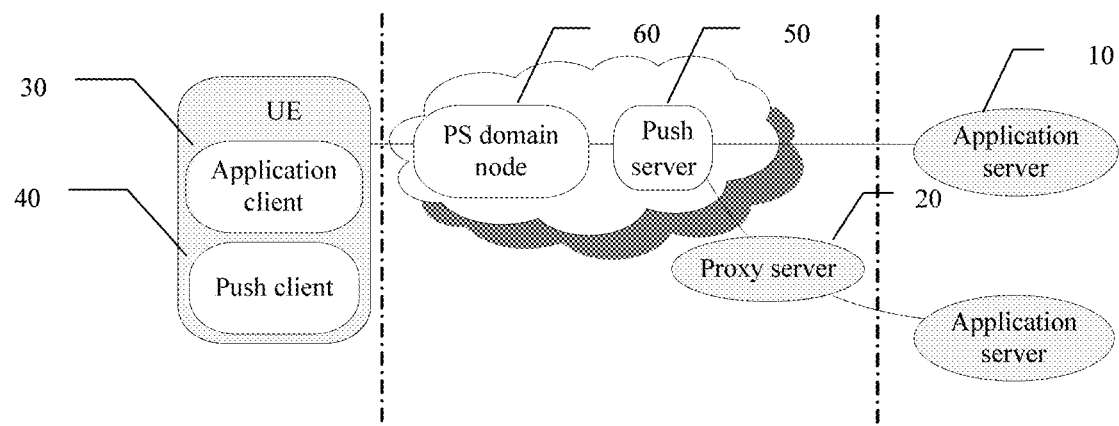
FIG. 4 is a schematic diagram of a Push system architecture according to an embodiment of the present invention.

A new Push system architecture provided in the embodiment of the present invention is as shown in FIG. 4. The following is a detailed description of each apparatus in the architecture.

Application server 10: configured to send a Push message.

In an embodiment, the application server 10 may be a server that provides a specific application service for a user, for example, MSN or QQ Server.

Proxy server 20: a special application server possibly involved in the embodiment of the present invention, which is configured to log into the application server 10 in place of a UE and supports a Push mechanism. A proxy client on the UE obtains application login information of the user, and sends the application login information to the proxy server 20. The proxy server 20 uses the application login information to log into a final application server. When the user shuts down the proxy client, the proxy server 20 continues to maintain the login for the user on the application server 10. When the application server 10 or another application user sends a message to an application account of the user, the proxy server 20 pushes the message to a user terminal in a Push manner.

It should be noted that, the proxy server 20 is not a mandatory apparatus in the architecture shown in FIG. 4. If the application server 10 itself supports a Push service, the proxy server 20 is not needed. If the application server 10 itself does not support the Push service, the proxy server 20 is needed. In this case, the proxy server 20 and the application server 10 may be deployed on one physical entity (such as a physical server), and may also be deployed on an separate physical entity (such as a physical server). A proxy server may provide proxy services for multiple application servers.

Application client 30: client software of an application service, such as MSN or QQ client software.

Push client 40: configured to run Push client software and initiate Push registration, and when receiving the Push message, make a corresponding response according to presetting.

In an embodiment, the making the corresponding response according to the presetting may include: starting a corresponding application client, or presenting a notification message to the UE interface, and so on.

Push server 50: a Push server, which primarily fulfill the following several aspects of functions:

1. Save a user identifier. The user identifier may include one or two of a static identifier and a dynamic identifier. The static identifier is an identifier allocated by an operator to a user who subscribes to a Push service when the user subscribes to the Push service or when the user uses the Push service for the first time. The static identifier is permanently valid. A Push service subscriber may own one or multiple user static identifiers. The dynamic identifier is an identifier allocated by the Push server to a user dynamically according to a user's requirement every time when the Push client is registered with the Push server, and the dynamic identifier has a validity period.

It should be emphasized that, the dynamic identifier is optional. If the static identifier is available, all service procedures may be completed totally based on the static identifier. In this case, the Push Server does not need to allocate any dynamic identifier to the UE. The user identifier (including a static identifier and a dynamic identifier) carries domain information of the Push service to which the user subscribes, for example, username@push.chinamobile.com. The application server can find a corresponding Push server according to the user identifier.

2. Save an application identifier. The application identifier refers to an identifier of an application service, and is an application identifier defined by the operator. An application service that uses a Push service needs to be registered with the operator. The operator allocates an application identifier used in the Push service to the application service. The Push message delivered by the application server should include the application identifier.

3. Save a mapping between the user identifier and a private IP address of a UE. One user identifier may correspond to private IP addresses of multiple UEs.

Optionally, a mapping between the user identifier and a user IMSI may also be retained. Especially, in a case that the UE obtains no private IP address (for example, the UE is attached onto a wireless network only, but no Internet-related service is initiated, so that no private IP address is allocated), the mapping between the user identifier and the user IMSI needs to be saved.

4. Receive the Push message delivered by the application server 10, query the private IP address or the IMSI of the UE according to the user identifier, and forward the Push message to the UE through a PS domain node according to the private IP address or the IMSI of the UE. Optionally, after receiving the Push message delivered by the application server, the Push Server may authenticate the application identifier carried in the Push message first, and if the application identifier is valid, perform the following operations.

PS domain node 60: configured to provide a service of connecting the UE to the Push server 50, and send the Push message to the UE.

Further, according to different application scenarios, the PS domain node comes in two types:

A first type of PS domain node is called a first PS domain node in the embodiment of the present invention. The first PS domain node is used as an outbound gateway, which is responsible for functions such as packet network access control, data routing, UE IP address allocation, mobility management, and user data management. This type of node is called a GGSN in a 2G GPRS network and a 3G network, is called a P-GW or an HA in a subsequent long term evolution network, is called an ASN GW or an HA in a WiMAX network, and is called a PDSN or an HA in a 3GPP2 network. Functions fulfilled by the node are similar.

A second type of PS domain node is called a second PS domain node in this patent. The second PS domain node is used as a serving gateway for the UE to access a PS domain, and is responsible for functions such as authentication and encryption, mobility management, session control, and data routing. This type of node is called an SGSN in a 2G GPRS network and a 3G network, is called an S-GW or an MME (Mobility Management Entity) in a subsequent evolved network, is called an ASN GW in a WiMAX network, and is called a PDSN in a 3GPP2 network. Functions fulfilled by the node are similar.

In the embodiment of the present invention, if the UE obtains a private IP address allocated by the first PS domain node, only the first PS domain node is needed to complete sending of the Push message to the UE; if the UE obtains no private IP address (for example, the UE is attached to the wireless network only, but no Internet-related service is initiated, so that no private IP address is allocated), the first PS domain node needs to work together with the second PS domain node to complete sending of the Push message to the UE.

According to the embodiment of the present invention, after completing the Push registration, the Push client on the UE may be disconnected from the Push server, which avoids a heartbeat connection required by a traditional Push service and a change of an existing NAT mechanism; it is not required that the application client on the UE is online all the time, but the UE is found through the PS domain node and the Push message is sent to the UE, thereby ensuring that the user is always reachable to the Push message, saving network resources and reducing UE power consumption, and lightening a signaling load of a network side.

Embodiment 2

Figure 5:
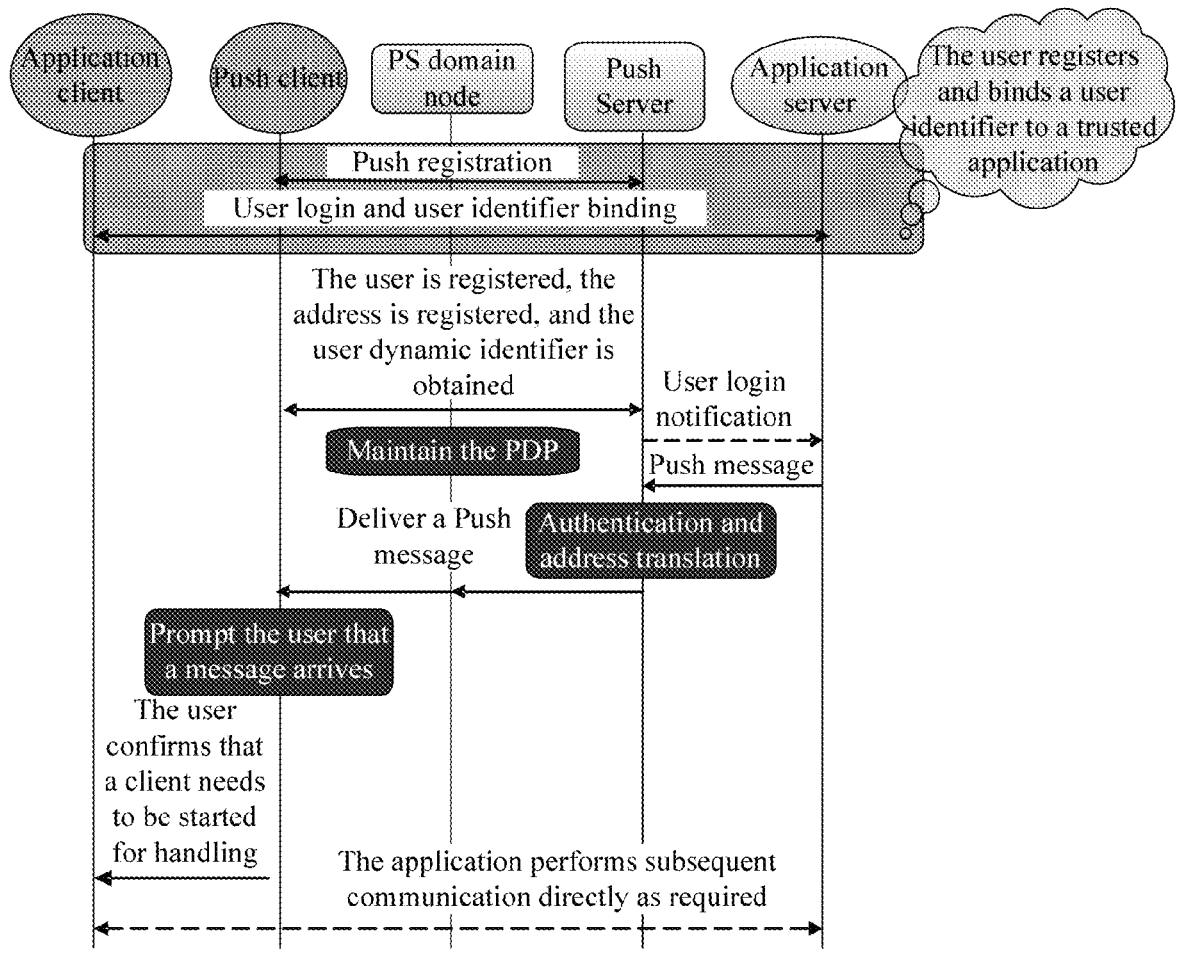
FIG. 5 is a schematic diagram of a Push service interaction process according to an embodiment of the present invention.

The embodiment of the present invention provides a new Push service. An interaction process is as shown in FIG. 5. In the embodiment, a UE obtains a private IP address. The following is a detailed description of the interaction process.

Before a Push service is provided, a UE needs to obtain a private IP address. Taking a PS domain of an existing wireless network as an example, after the UE is attached to a network, the UE requests an IP address from the network. The address may be a static or dynamic PDP address. The static PDP address needs to be allocated by a home network HPLMN to the UE permanently, and the dynamic PDP address may be allocated by the HPLMN or a VPLMN to the UE dynamically.

When a PDP context is activated, the HPLMN or the VPLMN allocates a PDP address to the UE, and a first PS domain node is responsible for allocating or releasing a dynamic address.

The IP address allocated to the UE is a private address managed by the first PS domain node, namely, the foregoing private IP address. Generally, the private IP address is allocated according to a network segment. Therefore, according to a network segment to which the private IP address of the UE belongs, a first PS domain node currently connected to the UE may be found.

Taking into consideration that a private network address cannot be routed in some cases, for example, network segments of the first PS domain node are overlapped, a VPN or tunnel connection needs to be set up between a Push server and the first PS domain node, to ensure service data transmission.

Before the Push service is provided, the Push server also needs to obtain and save a user identifier. The user identifier may include one or two of a static identifier and a dynamic identifier. The static identifier is an identifier allocated by an operator to a user who subscribes to a Push service when the user subscribes to the Push service or when the user uses the Push service for the first time. The static identifier is permanently valid. A Push service subscriber may own one or multiple user static identifiers. The dynamic identifier is an identifier allocated by the Push server to a user dynamically according to a user's requirement every time when a Push client is registered with the Push server, and the dynamic identifier has a validity period. It should be emphasized that, the dynamic identifier is optional. If the static identifier is available, all service procedures may be completed totally based on the static identifier. In this case, the Push Server does not need to allocate any dynamic identifier to the UE.

Before the Push service is provided, the Push server also needs to obtain and save an application identifier. The application identifier refers to an identifier of an application service, and is an application identifier defined by the operator. An application service that uses a Push service needs to be registered with the operator. The operator allocates an application identifier used in the Push service to the application service.

Before the Push service is provided, the Push server also needs to obtain and save a mapping between the user identifier and the private IP address of the UE. One user identifier may correspond to private IP addresses of multiple UEs.

When the user uses the Push service for the first time, the Push client registers with the Push server first. The Push server completes authentication of the user through the user static identifier.

An APN of the Push server needs to be preconfigured on the UE. Every time before the Push client registers with the Push server, the UE reports the APN to the network. The network allocates a corresponding first PS domain node to the UE according to the APN. Afterward, a registration message sent by the Push client is sent to the first PS domain node. The first PS domain node finds a corresponding Push server according to the APN, and sends the registration message to the Push Server. After completing processing of the registration, the Push server returns a registration response message to the Push client. In this way, a registration process is complete.

In a special scenario, duplicate addresses may occur. That is, the Push server stores correspondence between the user identifier and the private IP address of the UE, but the private IP address of the UE changes, and the original private IP address is allocated to another UE. Therefore, when the Push server needs to send the Push message to the original UE, the Push server still sends the Push message to the original private IP address according to the original correspondence, and the Push message is sent to the UE that obtains the private IP address subsequently. To avoid duplicate addresses, it is required in the present invention that, when a private IP address of a UE is released, the Push server is notified that a record of correspondence between a corresponding user identifier and the private IP address should be deleted. That is, if the UE initiates release of the private IP address, before the release, the Push client first notifies the Push server that the record of the correspondence between the corresponding user identifier and the private IP address should be deleted; if a network side initiates release of the private IP address, the first PS domain node notifies the Push server that the record of the correspondence between the corresponding user identifier and the private IP address at the same time.

When the user uses the Push service for the first time, the application client registers with the application server, and registers the user static identifier and an application username, and the application server stores the user static identifier and the application username.

After logging into the application server through the application client, the UE may exit the application client, and be disconnected from the application server. At this stage, the first PS domain node maintains and does not release the pdp context for the application client to log into the application server.

Figure 6:
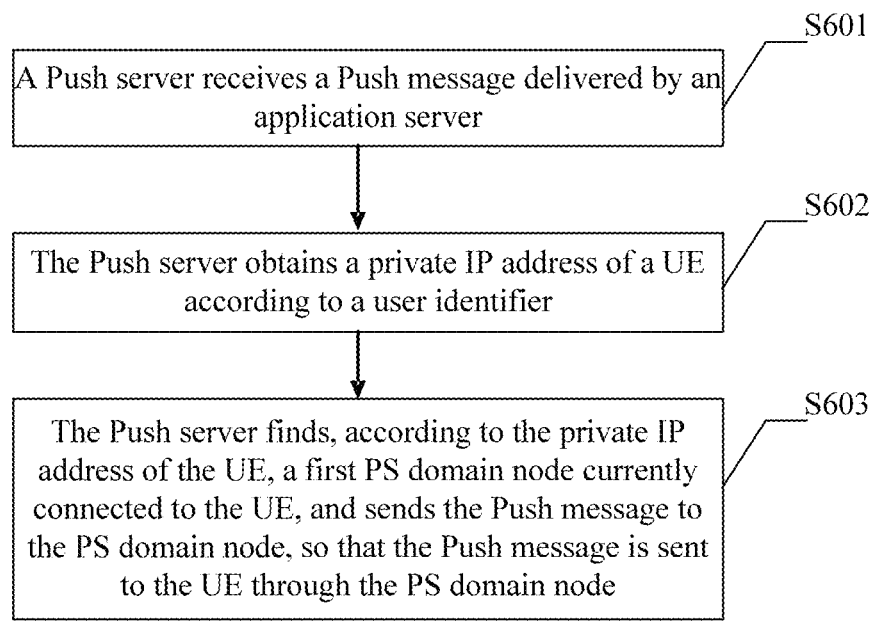
FIG. 6 is a schematic diagram of a Push service processing procedure according to an embodiment of the present invention.

A procedure of the Push service is as shown in FIG. 6, and its detailed steps are as follows:

S601: A Push server receives a Push message delivered by an application server.

Optionally, after receiving the Push message delivered by the application server, the Push server may authenticate an application identifier carried in the Push message, and if the application identifier is valid, perform the following operations.

Optionally, after receiving the Push message delivered by the application server, the Push server may also authenticate the application server that sends the Push message. The application server may be authenticated based on an application server domain name carried in a header of the Push message, and authenticated according to the application server domain name; and may also be authenticated based on a source IP address of the Push message, where the IP address is an IP address of the application server. If the application server may use the Push service, the following operations are performed.

Neither, or either, or both of the foregoing two optional authentication steps may be performed.

S602: The Push server obtains a private IP address of a UE according to a user identifier. The Push server obtains the user identifier from the Push message, and obtains the private IP address of the UE according to a mapping between the user identifier and the private IP address of the UE. Optionally, the Push server authenticates validity of the user identifier in the Push message.

S603: The Push server obtains, according to the private IP address of the UE, a first PS domain node currently connected to the UE, and sends the Push message to the first PS domain node, so that the Push message is sent to the UE through the PS domain node.

A method for obtaining, by the Push server and according to the private IP address of the UE, the first PS domain node currently connected to the UE is described in detail in the former part of the embodiment, and is not repeated here.

According to an IP quintuple (destination address, destination port, source address, source port, and IP version) in the Push message, the PS domain node finds a corresponding PDP context, adds the Push message and the application identifier to the PDP context, and sends the PDP context to the UE.

When arrival of a Push message is detected, a Push client on the UE prompts the user about the arrival of the Push message, and inquires whether to view the Push message. If the user chooses to view the Push message, a corresponding application client is started according to the application identifier to view the information. Afterward, another application service data exchange may be further performed. If the user chooses not to view the Push message, the procedure ends. Alternatively, if arrival of a Push message is detected by a Push client on the UE, and the Push message is only a message of a notification type, the Push client only displays the arrival of the Push message to the user, without starting another application client.

Further, if the UE is in an idle state, the PS domain node needs to initiate a paging process in the prior art to activate the UE. If the PS domain node needs to send a Push message to a certain UE, but the UE is in an idle state, the PS domain node first activates the UE through paging, and then performs subsequent Push message sending.

According to the embodiment of the present invention, after completing the Push registration, the Push client on the UE may be disconnected from the Push server, which avoids a heartbeat connection required by a traditional Push service and a change of an existing NAT mechanism; it is not required that the application client on the UE is online all the time, but the UE is found through the PS domain node and the Push message is sent to the UE, thereby ensuring that the user is always reachable to the Push message, saving network resources and reducing UE power consumption, and lightening a signaling load of a network side.

Embodiment 3

Figure 7:
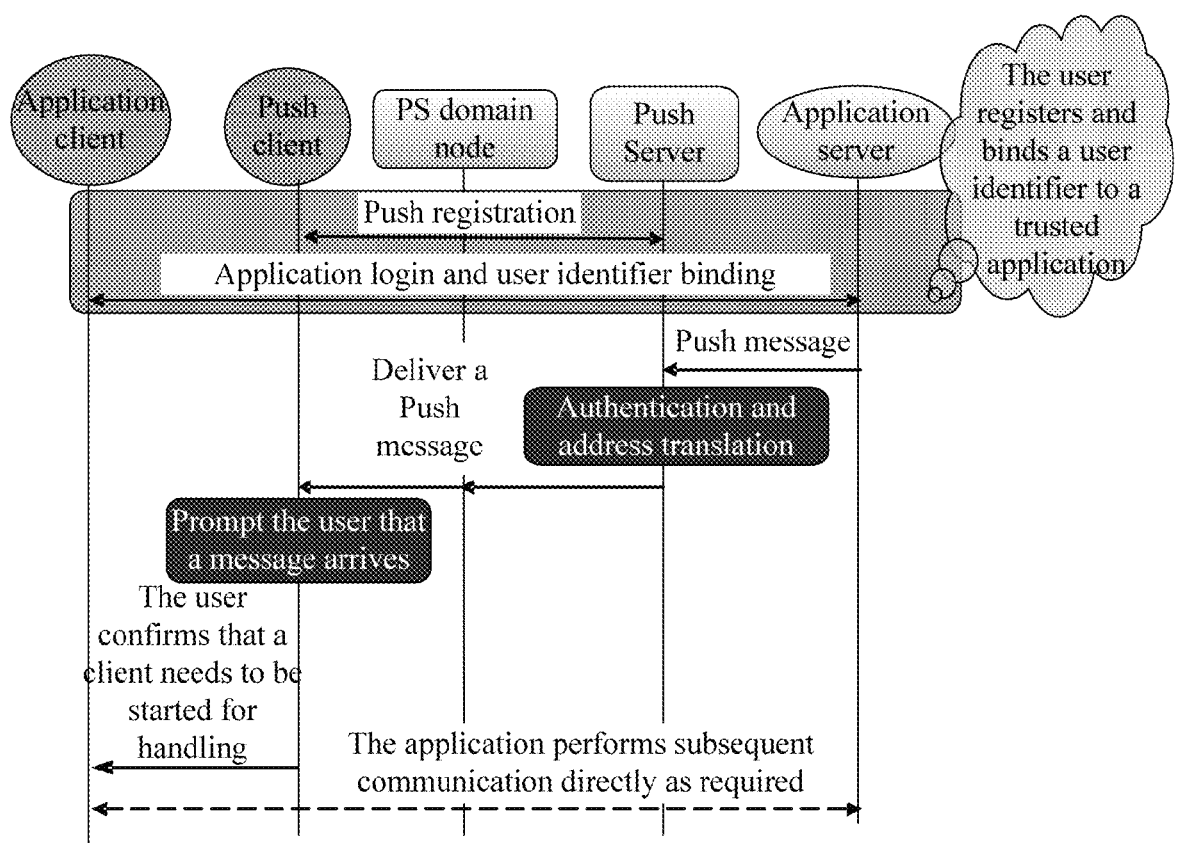
FIG. 7 is a schematic diagram of an enhanced Push service interaction process according to an embodiment of the present invention.

The embodiment of the present invention provides a new Push service as a further enhancement on the basis of Embodiment 2. Its interaction process is as shown in FIG. 7. In the embodiment, a UE is attached to a network only, and has no available private IP address. The following is a detailed description of the interaction process.

Before a Push service is provided, a Push server needs to obtain and save a user identifier. In the embodiment, the user identifier refers to a static identifier, namely, an identifier allocated by an operator to a user who subscribes to a Push service when the user subscribes to the Push service or when the user uses the Push service for the first time. The static identifier is permanently valid. A Push service subscriber may own one or multiple user static identifiers.

Before the Push service is provided, the Push server also needs to obtain and save an application identifier. The application identifier refers to an identifier of an application service, and is an application identifier defined by the operator. An application service that uses a Push service needs to be registered with the operator. The operator allocates an application identifier used in the Push service to the application service.

Before the Push service is provided, the Push server also needs to obtain and save a mapping between the user identifier and an UE IMSI. That is, the operator binds a user static identifier to the UE IMSI when the user subscribes to the Push service or when the user uses the Push service for the first time.

When the user uses the application service for the first time, an application client registers with an application server, and registers the user static identifier and an application username, and the application server stores the user static identifier and the application username.

Figure 8:
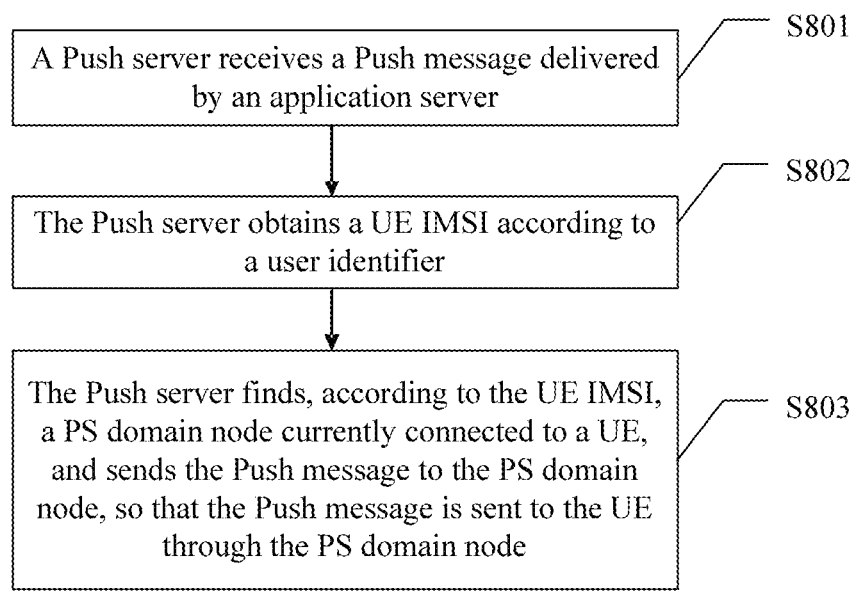
FIG. 8 is a schematic diagram of an enhanced Push service processing procedure according to an embodiment of the present invention.

A procedure of the Push service is as shown in FIG. 8, and its detailed steps are as follows:

S801: A Push server receives a Push message delivered by an application server.

Optionally, after receiving the Push message delivered by the application server, the Push server may authenticate an application identifier carried in the Push message, and if the application identifier is valid, perform the following operations.

Optionally, after receiving the Push message delivered by the application server, the Push server may also authenticate the application server that sends the Push message. The application server may be authenticated based on an application server domain name carried in a header of the Push message, and authenticated according to the application server domain name; and may also be authenticated based on a source IP address of the Push message, where the IP address is an IP address of the application server. If the application server may use the Push service, the following operations are performed.

Neither, or either, or both of the foregoing two optional authentication steps may be performed.

S802: The Push server obtains a user IMSI according to a user identifier. The Push server obtains the user identifier from the Push message, and obtains the user IMSI according to a mapping between the user identifier and the user IMSI. Optionally, the Push server authenticates validity of the user identifier in the Push message. In the embodiment, the user identifier refers to a static identifier.

S803: The Push server selects a PS domain node according to the user IMSI, and sends the Push message and the IMSI to the PS domain node, so that the Push message is sent to a UE through the PS domain node. Optionally, the Push server may send the Push message and the application identifier to the UE by using a CS domain routing method.

The selecting a PS domain node according to the user IMSI by the Push server includes the following process:

The Push server sends a query message to a server that stores user information (such as subscription information or location information of the user) to query network attachment information of the IMSI. In different networks, the server that stores the user information may be a different network entity. For example, the server that stores the user information may be an HLR or an HSS in a 3GPP network, and may also be an AAA server in a 3GPP2 or WiMAX network and may also be an AAA server in a 3GPP network interconnected to a heterogeneous network. In the embodiment, the 3GPP network is taken as an example. That is, the Push Server sends an SRI for GPRS message that carries an IMSI to the HLR or the HSS to query whether the IMSI is attached to a network (for the SRI for GPRS message, reference may be made to 3GPP TS 23.060 v700). If the IMSI is attached to a network, the HSS or the HLR returns a second PS domain node to which the IMSI is attached, to the Push server, and the Push server selects a first PS domain node capable of communicating with the second PS domain node, and sends the Push message to the selected first PS domain node.

Alternatively, the Push server adds its APN to the query message. The HLR or the HSS determines that the IMSI is attached to the network, and then selects a first PS domain node according to the APN, and returns information (an address or a domain name) of the first PS domain node to the Push server. The Push server sends the Push message (that carries the user identifier and the IMSI) to a GGSN.

Alternatively, an operator presets a rule for selecting an APN corresponding to the Push service. Then, the Push server selects a first PS domain node according to the APN, and sends the Push message to the first PS domain node.

Certainly, if the Push server queries the HLR or the HSS and finds that the IMSI is not attached to the network, an entire Push procedure ends, and a failure indication is returned to the application server.

Figure 9:
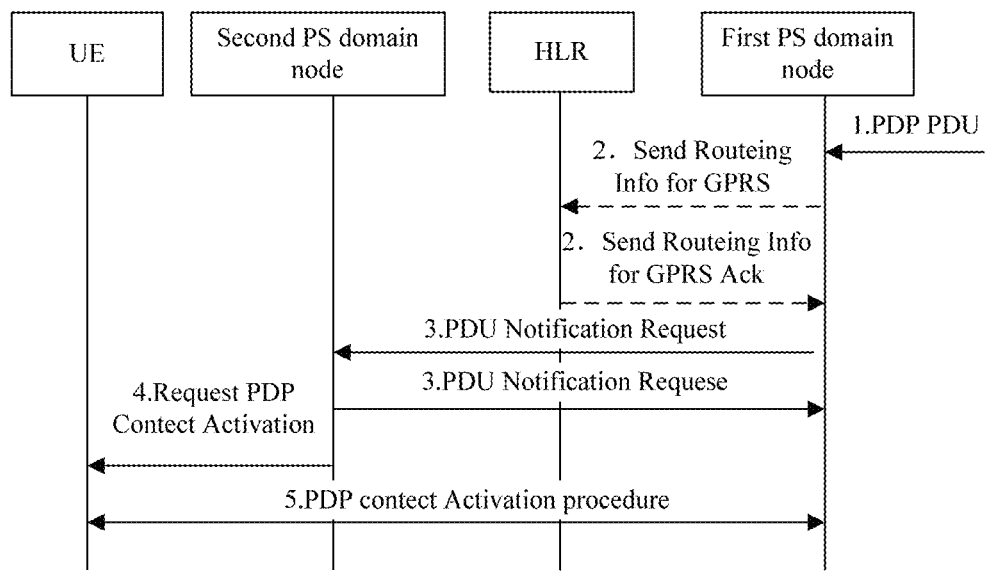
FIG. 9 is a schematic diagram of an interaction process of sending a Push message to a UE by a first PS domain node according to an embodiment of the present invention.
Figure 10:
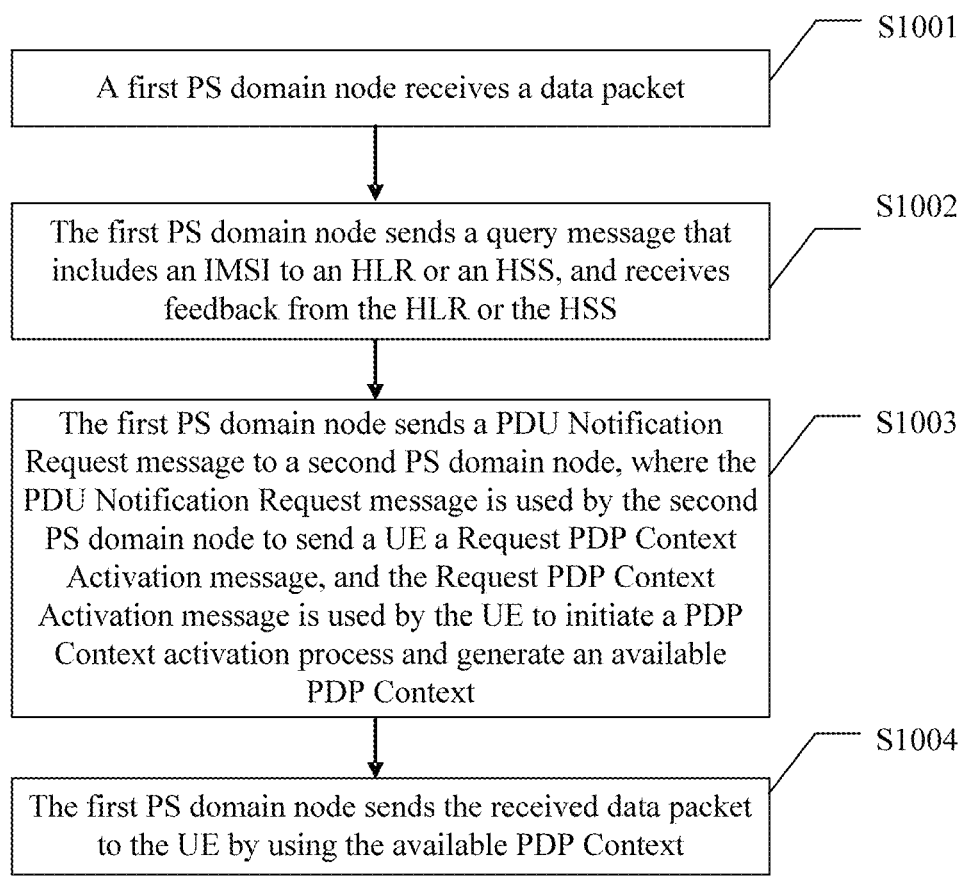
FIG. 10 is a schematic diagram of a processing procedure of sending a Push message to a UE by a first PS domain node according to an embodiment of the present invention.

Further, after the first PS domain node is selected, the Push server sends the Push message and the IMSI to the first PS domain node, and adopts an interaction process shown in FIG. 9 to send the Push message to the UE. Its detailed steps are as shown in FIG. 10. Processes described in FIG. 9 and FIG. 10 take the 3GPP network as an example. For a non 3GPP network, a node that performs a similar interaction function has a different name, and an exchanged message has a different name, but its interaction procedure is the same. The following is specific explanation of steps in FIG. 10:

S1001: The first PS domain node receives a data packet (including a Push message and an IMSI). A name of the data packet varies in different wireless networks, for example, a PDP PDU packet in a WCDMA network.

S1002: The first PS domain node sends a query message including the IMSI to the HLR or the HSS. If the HLR or the HSS finds the UE of the IMSI by searching, a query result is returned, where the query result includes the IMSI, an address of the second PS domain node, a reason for terminal unreachability, and so on.

S1003: If the first PS domain node finds the address of the second PS domain node by searching, there is no reason for terminal unreachability or the reason for terminal unreachability is no paging response, and the UE has a static PDP address (IP address), the first PS domain node sends the second PS domain node a PDU Notification Request (protocol data unit notification request) message, where the PDU Notification Request message includes an IMSI, a PDP type (PDP type), a PDP address, an APN, and so on, and is used by the second PS domain node to send the UE a Request PDP Context Activation (request packet data protocol content activation) message including a Transaction Identifier (TI), a PDP type, a PDP address, an APN, and so on. The Request PDP Context Activation message is used by the UE to initiate a PDP Context activation process and generate an available PDP Context.

The second PS domain node returns a PDU Notification Response message to the first PS domain node as an acknowledgement.

S1004: The first PS domain node sends the received data packet to the UE by using the PDP Context.

Further, if the UE has no static PDP address (IP address), step S1003 and step S1004 may be one of the following three combinations:

Combination 1:

S1003: If the first PS domain node finds the address of the second PS domain node by searching, there is no reason for terminal unreachability or the reason for terminal unreachability is no paging response, and the UE has no static PDP address (IP address), the first PS domain node sends the second PS domain node a PDU Notification Request message, where the PDU Notification Request message includes an IMSI, a PDP type, a PDP address, an APN, and so on, and the PDP address is left blank; and the PDU Notification Request message is used by the second PS domain node to send the UE a Request PDP Context Activation message, including a TI, a PDP type, a PDP address, an APN, and so on, where the PDP address is the PDP address in the PDU Notification Request message; the Request PDP Context Activation message is used by the UE to initiate a PDP Context activation process, request a dynamic PDP address, and generate an available PDP Context.

The second PS domain node returns a PDU Notification Response message to the first PS domain node as an acknowledgement.

S1004: The first PS domain node sends the received data packet to the UE by using the PDP Context.

Combination 2:

S1003: If the first PS domain node finds the address of the second PS domain node by searching, there is no reason for terminal unreachability or the reason for terminal unreachability is no paging response, and the UE has no static PDP address (IP address), the first PS domain node allocates a dynamic PDP address to the UE first, and then the first PS domain node sends the second PS domain node a PDU Notification Request message, where the PDU Notification Request message includes an IMSI, a PDP type, a PDP address, an APN, and so on, the PDP address is filled with the dynamic PDP address, and an indication field indicating that the address is a newly-allocated address is added. The PDU Notification Request message is used by the second PS domain node to send the UE a Request PDP Context Activation message, including a TI, a PDP type, a PDP address, an APN, an indication field, and so on, where the PDP address is the PDP address in the PDU Notification Request message, and the indication field is the indication field in the PDU Notification Request message; the Request PDP Context Activation message is used by the UE to initiate a PDP Context activation process and generate an available PDP Context by using the PDP address and the indication field of the Request PDP Context Activation message.

The second PS domain node returns a PDU Notification Response message to the first PS domain node as an acknowledgement.

S1004: The first PS domain node sends the received data packet to the UE by using the PDP Context.

Combination 3:

S1003: If the first PS domain node finds the address of the second PS domain node by searching, there is no reason for terminal unreachability or the reason for terminal unreachability is no paging response, and the UE has no static PDP address (IP address), the first PS domain node sends the second PS domain node a PDU Notification Request message, where the PDU Notification Request message includes an IMSI, a PDP type, a PDP address, an APN, and so on, the PDP address is left blank, and an indication field is added and indicates that it is requested to initiate a PDP context activation procedure on a network side when no static IP address is available. The PDU Notification Request message is used by the second PS domain node to send the UE a Request PDP Context Activation message, including a TI, a PDP type, a PDP address, an APN, an indication field, and so on, where the PDP address is the PDP address in the PDU Notification Request message, and the indication field is the indication field in the PDU Notification Request message; the Request PDP Context Activation message is used by the UE to initiate a PDP Context activation process, and to use the indication field in the Request PDP Context Activation message to request a dynamic PDP address and generate an available PDP Context.

The second PS domain node returns a PDU Notification Response message to the first PS domain node as an acknowledgement.

S1004: The first PS domain node sends the received data packet to the UE by using the PDP Context.

Further, when arrival of a Push message is detected, a Push client on the UE prompts the user about the arrival of the Push message, and inquires whether to view the Push message. If the user chooses to view the Push message, a corresponding application client is started according to the application identifier to view the information. Afterward, another application service data exchange may be further performed. If the user chooses not to view the Push message, the procedure ends.

According to the embodiment of the present invention, after completing the Push registration, the Push client on the UE may be disconnected from the Push server, which avoids a heartbeat connection required by a traditional Push service and a change of an existing NAT mechanism; it is not required that the application client on the UE is online all the time, but the UE is found through the PS domain node and the Push message is sent to the UE, thereby ensuring that the user is always reachable to the Push message, saving network resources and reducing UE power consumption, and lightening a signaling load of the network side.

Embodiment 4

Figure 11:
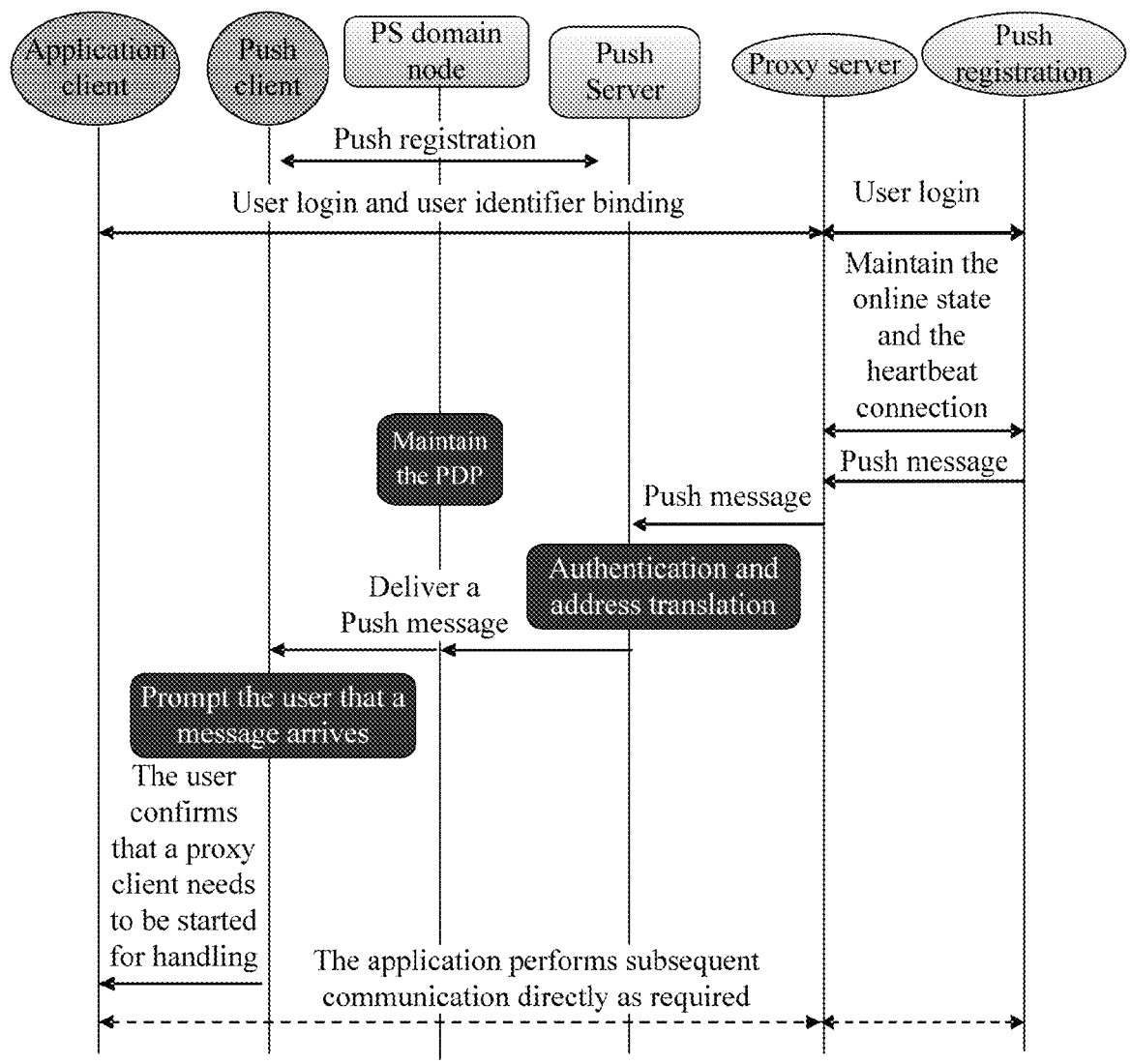
FIG. 11 is a schematic diagram of a Push service interaction process in which a proxy server is introduced according to an embodiment of the present invention.

The embodiment of the present invention provides a new Push service. An interaction process is as shown in FIG. 11. In the embodiment, a UE obtains a private IP address, and an application server uses a proxy server to provide a Push service.

A processing procedure of the embodiment of the present invention is similar to that of Embodiment 2 except that the application server in Embodiment 2 is replaced with the proxy server in the embodiment, and that an interaction process between the proxy server and the application server is added. In the embodiment, parts that are the same as those in Embodiment 2 are not repeatedly described. The following describes only the difference and the added interaction process between the proxy server and the application server.

After the UE logs into the proxy server through the application client, login information carries application information (such as a username and a password) and a user dynamic identifier. In place of the user, the proxy server logs into the application server with respect to the application service, and the login information carries the application information such as the username and the password.

The proxy server maintains a login state on the application server in place of the user (for example, maintains a heartbeat connection).

The application server sends a Push message to the user, that is, sends a message to the proxy server. The Push message carries the username which is an application layer identifier of the user.

The proxy server finds the user dynamic identifier according to the username, and sends a Push message that includes the user dynamic identifier and an application identifier to a Push server, where the application identifier is an identifier of a proxy service.

Subsequent processing procedures are the same as those in Embodiment 2.

According to the embodiment of the present invention, after completing the Push registration, the Push client on the UE may be disconnected from the Push server, which avoids a heartbeat connection required by a traditional Push service and a change of an existing NAT mechanism; it is not required that the application client on the UE is online all the time, but the UE is found through the PS domain node and the Push message is sent to the UE, thereby ensuring that the user is always reachable to the Push message, saving network resources and reducing UE power consumption, and lightening a signaling load of a network side.

Embodiment 5

Figure 12:
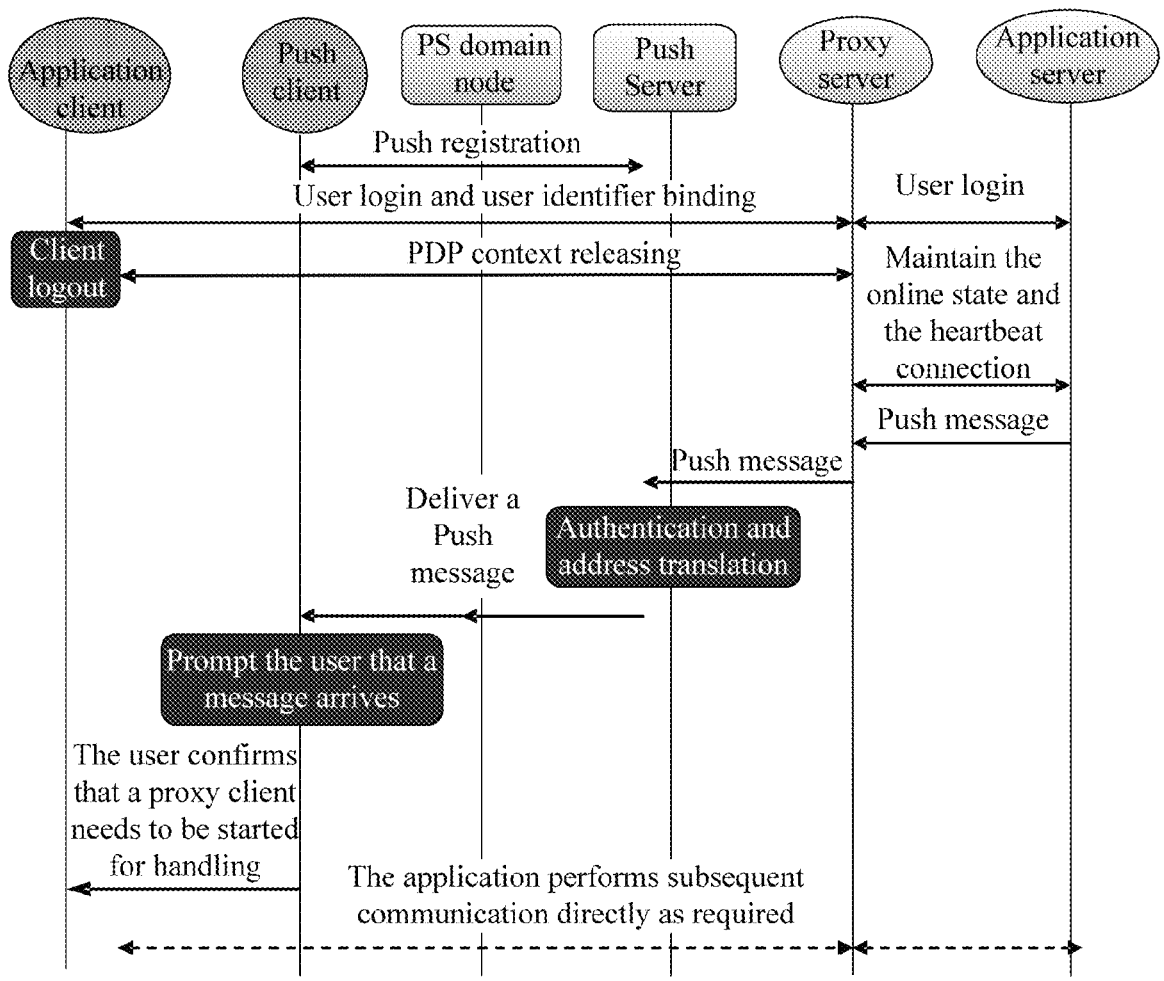
FIG. 12 is a schematic diagram of an enhanced Push service interaction process in which a proxy server is introduced according to an embodiment of the present invention.

The embodiment of the present invention provides a new Push service. An interaction process is as shown in FIG. 12. In the embodiment, a UE is attached to a network only, and has no available private IP address. Moreover, an application server uses a proxy server to provide a Push service.

A processing procedure of the embodiment of the present invention is similar to that of Embodiment 3 except that the application server in Embodiment 3 is replaced with the proxy server in the embodiment, and that an interaction process between the proxy server and the application server is added. In the embodiment, parts that are the same as those in Embodiment 3 are not repeatedly described. The following describes only the difference and the added interaction process between the proxy server and the application server.

When a user subscribes to a Push service or uses a Push service for the first time, the user needs to register an IMSI with an operator. The operator allocates a user static identifier to the user. A Push server saves correspondence between the user static identifier and the IMSI.

After the UE accesses the network and obtains an IP address, a Push client registers the static identifier and the IP address with the Push server, and obtains a dynamic identifier. Afterward, an application client initiates application login to the proxy server, and reports application login information (an application username and password) and the user dynamic identifier. Then, the proxy client logs into the application server in place of the user by using the application login information.

Afterward, the UE exits the proxy client, releases used PDP Context, and has no IP address.

When the application server sends a Push message to the user, the application server sends a Push message that carries a username to the proxy server. The username in the Push message is an application layer identifier of the user. The proxy server finds a corresponding user dynamic identifier according to the username, and sends a Push message that includes the user dynamic identifier and an application identifier to the Push server, where the application identifier is an identifier of the proxy server.

Subsequent processing procedures are the same as those in Embodiment 2.

According to the embodiment of the present invention, after completing the Push registration, the Push client on the UE may be disconnected from the Push server, which avoids a heartbeat connection required by a traditional Push service and a change of an existing NAT mechanism; it is not required that the application client on the UE is online all the time, but the UE is found through the PS domain node and the Push message is sent to the UE, thereby ensuring that the user is always reachable to the Push message, saving network resources and reducing UE power consumption, and lightening a signaling load of a network side.

Embodiment 6

Figure 13:
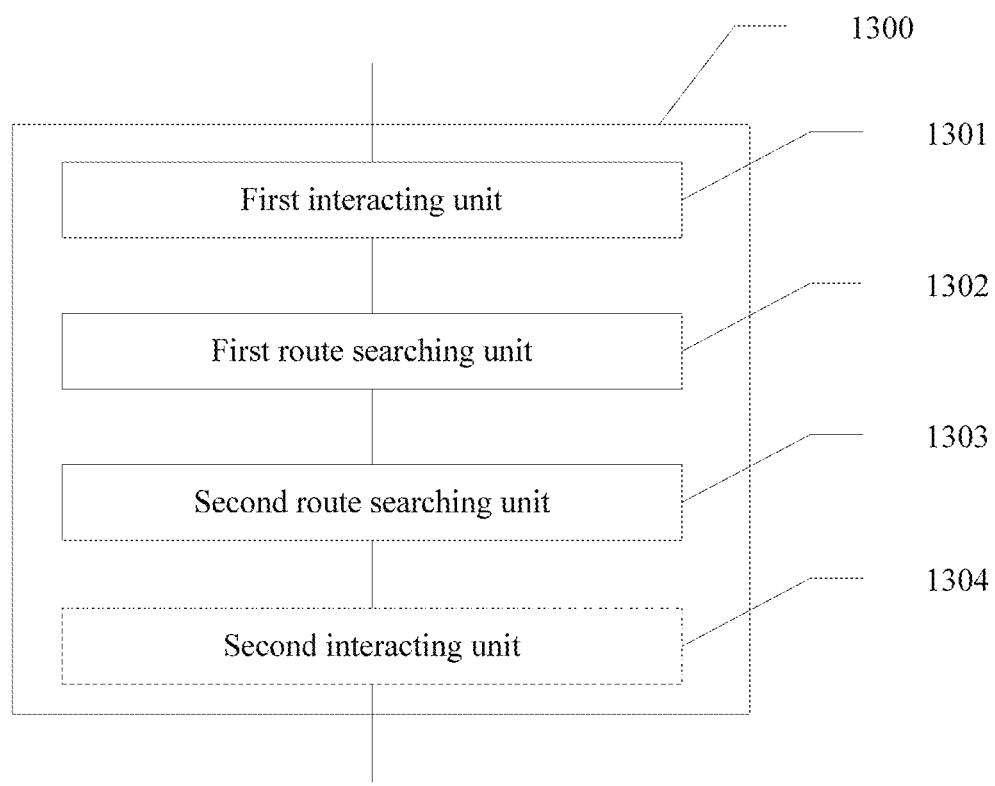
FIG. 13 is a schematic diagram of a Push server apparatus according to an embodiment of the present invention.

The embodiment provides a Push server apparatus. As shown in FIG. 13, an apparatus 1300 includes:

A first interacting unit 1301 is configured to receive a Push message delivered by an application server.

Optionally, if the application server does not support a Push service, this unit receives a Push message that is of the application server and forwarded by a proxy server.

Optionally, after receiving the Push message delivered by the application server, the unit 1301 may authenticate an application identifier carried in the Push message, and if the application identifier is valid, perform the following operations.

Optionally, after receiving the Push message delivered by the application server, the unit 1301 may also authenticate the application server that sends the Push message. The application server may be authenticated based on an application server domain name carried in a header of the Push message, and authenticated according to the application server domain name; and may also be authenticated based on a source IP address of the Push message, where the IP address is an IP address of the application server. If the application server may use the Push service, the following operations are performed.

The application identifier refers to an identifier of the application service, and is an application identifier defined by an operator. An application service that uses a Push service needs to be registered with the operator. The operator allocates an application identifier used in the Push service to the application service.

Neither, or either, or both of the foregoing two optional authentication steps may be performed.

A first route searching unit 1302 is configured to obtain a private IP address of a user equipment UE according to a user identifier, where the user identifier is obtained from the Push message. In an embodiment, the user identifier may include one or two of a static identifier and a dynamic identifier. Specifically, the first route searching unit 1302 may query, according to the user identifier, a stored mapping between the user identifier and the private IP address of the UE to obtain the private IP address of the user equipment UE.

A second route searching unit 1303 is configured to obtain, according to the private IP address of the UE, a first PS domain node currently connected to the UE, and send the Push message to the first PS domain node, so that the Push message is sent to the UE through the first PS domain node.

The first PS domain node currently connected to the UE may be found according to a network segment to which the private IP address of the UE belongs, or in another method described in Embodiment 2.

In an embodiment, as shown by the dashed box in FIG. 13, the apparatus may further include:

A second interacting unit 1304 is configured to forward the Push message delivered by the application server to a corresponding first PS domain node, where the first PS domain node is determined by the second route searching unit 1303

The second interacting unit 1304 is further configured to: receive a registration request that is of a Push client and forwarded by a PS domain node; and receive a request that is for deleting correspondence between the user identifier and the private IP address and sent by the first PS domain node or the UE.

According to the embodiment of the present invention, after completing the Push registration, the Push client on the UE may be disconnected from the Push server, which avoids a heartbeat connection required by a traditional Push service and a change of an existing NAT mechanism; it is not required that the application client on the UE is online all the time, but the UE is found through the PS domain node and the Push message is sent to the UE, thereby ensuring that the user is always reachable to the Push message, saving network resources and reducing UE power consumption, and lightening a signaling load of a network side.

Embodiment 7

Figure 14:
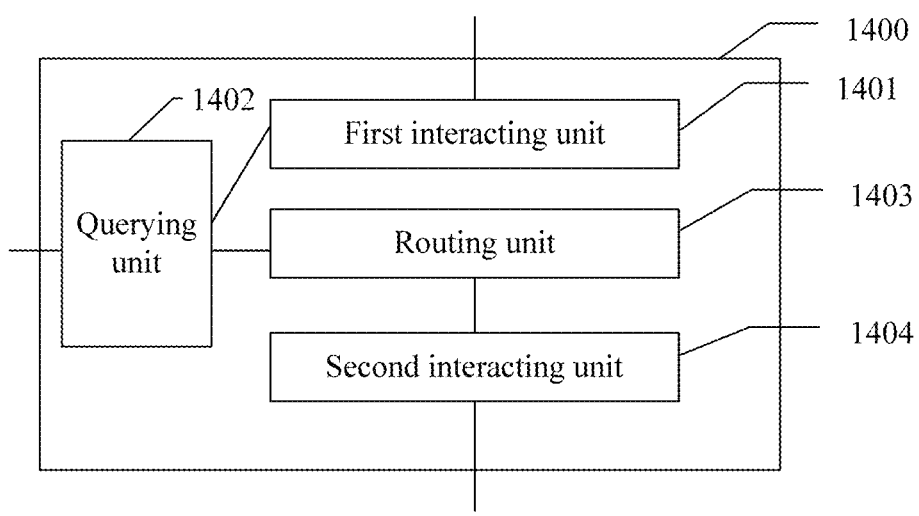
FIG. 14 is a schematic diagram of a first PS domain node apparatus according to an embodiment of the present invention.

The embodiment provides a first PS domain node apparatus. As shown in FIG. 14, an apparatus 1400 includes:

A first interacting unit 1401 is configured to receive a data packet, where the data packet includes a Push message and an IMSI.

A querying unit 1402 is configured to send a query message that includes an IMSI to a server that stores user information, and obtain returned information, where the returned information includes an address of a second PS domain node and a reason for terminal unreachability.

A routing unit 1403 is configured to: send a PDU Notification Request message to the second PS domain node, where the PDU Notification Request message is used by the second PS domain node to send a Request PDP Context Activation message to a UE, and the Request PDP Context Activation message is used by the UE to initiate a PDP Context activation process and generate an available PDP Context.

A PDP address in the PDU Notification Request message is a static PDP address of the UE, and a PDP address in the Request PDP Context Activation message is the PDP address in the PDU Notification Request message.

Alternatively, the PDP address in the PDU Notification Request message is left blank, and the PDP address in the Request PDP Context Activation message is the PDP address in the PDU Notification Request message. The UE initiates a PDP Context activation process to request a dynamic PDP address and generate an available PDP Context.

Alternatively, the PDP address in the PDU Notification Request message is allocated by the first PS domain node to the UE dynamically, and an indication field is added to indicate that the address is a newly-allocated address; the Request PDP Context Activation message includes a PDP type, a PDP address, and an indication field, where the PDP address is the PDP address in the PDU Notification Request message, and the indication field is the indication field in the PDU Notification Request message; the UE initiates a PDP Context activation process, and uses the PDP address and the indication field in the Request PDP Context Activation message to generate an available PDP Context.

Alternatively, the PDP address in the PDU Notification Request message is left blank, and an indication field is added to indicate that it is requested to initiate a PDP context activation procedure on a network side when no static IP address is available; the Request PDP Context Activation message includes a PDP type, a PDP address, and an indication field, where the PDP address is the PDP address in the PDU Notification Request message, and the indication field is the indication field in the PDU Notification Request message; the UE initiates a PDP Context activation process, and uses the indication field in the Request PDP Context Activation message to request a dynamic PDP address and generate an available PDP Context.

A second interacting unit 1404 is configured to send the received data packet to the UE by using the PDP Context.

According to the embodiment of the present invention, after completing the Push registration, a Push client on the UE may be disconnected from a Push server, which avoids a heartbeat connection required by a traditional Push service and a change of an existing NAT mechanism; it is not required that an application client on the UE is online all the time, but the UE is found through a PS domain node and the Push message is sent to the UE, thereby ensuring that the user is always reachable to the Push message, saving network resources and reducing UE power consumption, and lightening a signaling load of the network side.

Embodiment 8

Figure 15:
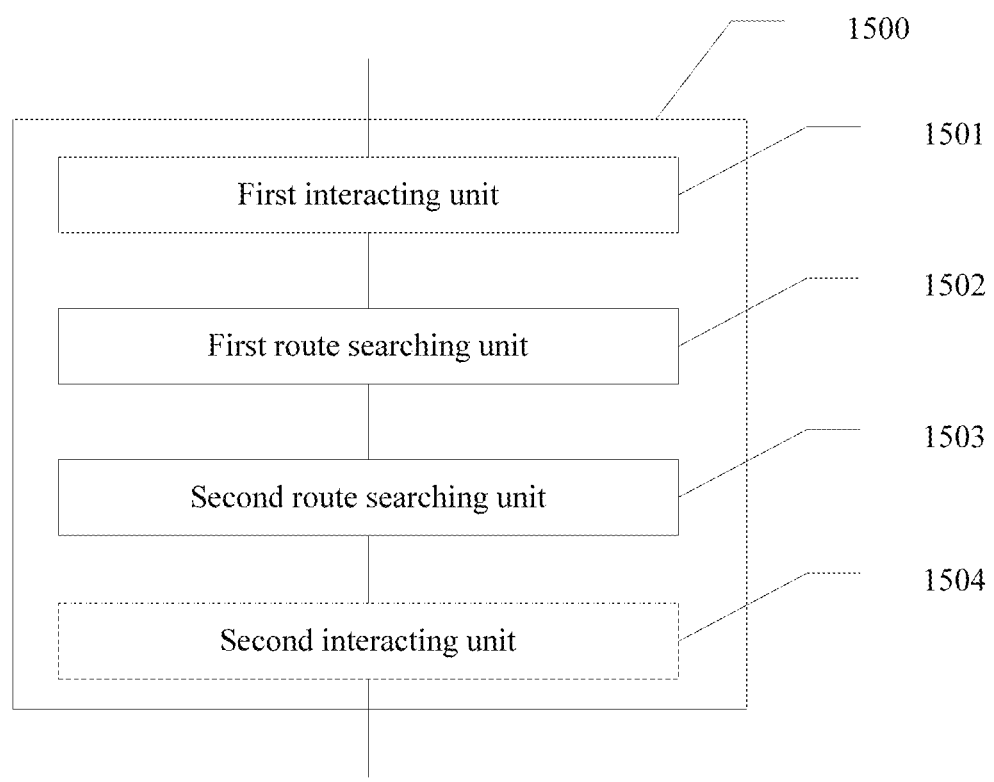
FIG. 15 is a schematic diagram of a second PS domain node apparatus according to an embodiment of the present invention.

The embodiment provides a Push server apparatus. As shown in FIG. 15, an apparatus 1500 includes:

A first interacting unit 1501 is configured to receive a Push message delivered by an application server.

Optionally, if the application server does not support a Push service, this unit receives a Push message that is of the application server and forwarded by a proxy server.

Optionally, after receiving the Push message delivered by the application server, the unit 1501 may authenticate an application identifier carried in the Push message, and if the application identifier is valid, perform the following operations.

Optionally, after receiving the Push message delivered by the application server, the unit 1501 may also authenticate the application server that sends the Push message. The application server may be authenticated based on an application server domain name carried in a header of the Push message, and authenticated according to the application server domain name; and may also be authenticated based on a source IP address of the Push message, where the IP address is an IP address of the application server. If the application server may use the Push service, the following operations are performed.

The application identifier refers to an identifier of the application service, and is an application identifier defined by an operator. An application service that uses a Push service needs to be registered with the operator. The operator allocates an application identifier used in the Push service to the application service.

Neither, or either, or both of the foregoing two optional authentication steps may be performed.

A first route searching unit 1502 is configured to obtain a user IMSI according to a user identifier, where the user identifier is obtained from the Push message. In an embodiment, the user identifier may include one or two of a static identifier and a dynamic identifier. Specifically, the first route searching unit 1502 may query, according to the user identifier, a stored mapping between the user identifier and the user IMSI to obtain the user IMSI.

A second route searching unit 1503 is configured to select a PS domain node according to the user IMSI, and send the Push message and the IMSI to the PS domain node, so that the Push message is sent to the UE through the PS domain node by using the method described in Embodiment 3.

In an embodiment, as shown by the dashed box in FIG. 15, the apparatus may further include:

A second interacting unit 1504 is configured to forward the Push message delivered by the application server to a corresponding first PS domain node, where the first PS domain node is determined by the second route searching unit 1503.

The second interacting unit 1504 is further configured to receive a registration request that is of a Push client and forwarded by the PS domain node.

In an embodiment, the second route searching unit 1503 may include a first searching subunit or a second searching subunit or a third searching subunit.

The first searching subunit is configured to: send, to a server that stores user information, a query message for querying network attachment information of the IMSI; obtain a second PS domain node returned by the server that stores the user information; and select a first PS domain node capable of communicating with the second PS domain node.

The second searching subunit is configured to: send, to the server that stores the user information, a query message for querying network attachment information of the IMSI; add an APN of the Push server to the query message; obtain a first PS domain node determined according to the APN and returned by the server that stores the user information; and select the returned first PS domain node.

The third searching subunit is configured to select the first PS domain node according to a preset rule by using the APN of the Push server.

According to the embodiment of the present invention, after completing the Push registration, the Push client on the UE may be disconnected from the Push server, which avoids a heartbeat connection required by a traditional Push service and a change of an existing NAT mechanism; it is not required that an application client on the UE is online all the time, but the UE is found through the PS domain node and the Push message is sent to the UE, thereby ensuring that the user is always reachable to the Push message, saving network resources and reducing UE power consumption, and lightening a signaling load of a network side.

Embodiment 9

Figure 16:
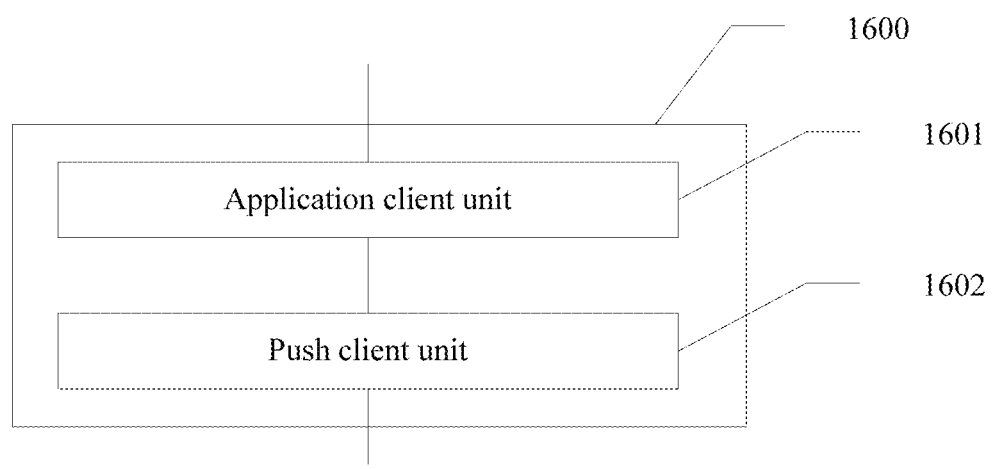
FIG. 16 is a schematic diagram of a UE apparatus according to an embodiment of the present invention.

The embodiment provides a UE apparatus. As shown in FIG. 16, an apparatus 1600 includes: an application client unit 1601, which is client software of an application service, such as MSN or QQ client software; and a Push client unit 1602, configured to initiate Push registration with a Push server, and when receiving a Push message sent by an application server, make a corresponding response according to presetting, for example, start a corresponding application client, or present a notification message to the UE interface.

According to the embodiment of the present invention, after completing the Push registration, the Push client on the UE may be disconnected from the Push server, which avoids a heartbeat connection required by a traditional Push service and a change of an existing NAT mechanism; it is not required that the application client on the UE is online all the time, but the UE is found through a PS domain node and the Push message is sent to the UE, thereby ensuring that the user is always reachable to the Push message, saving network resources and reducing UE power consumption, and lightening a signaling load of a network side.

Persons of ordinary skill in the art should understand that all or part of the procedures of the method according to the foregoing embodiments may be implemented by a computer program instructing relevant hardware. The program may be stored in a computer readable storage medium. When the program is run, the procedures of the method according to the foregoing embodiments are performed. The storage medium may be a magnetic disk, an optical disk, a read-only memory (ROM), or a random access memory (RAM), and so on.

Finally, it should be noted that the foregoing embodiments are merely provided for describing the technical solutions in the embodiments of the present invention, but not intended to limit the present invention. Although the embodiments of the present invention are described in detail with reference to the exemplary embodiments, persons of ordinary skill in the art should understand that they may still make modifications or equivalent replacements to the technical solutions in the embodiments of the present invention; however, these modifications or equivalent replacements cannot make the modified technical solutions depart from the spirit and scope of the technical solutions in the embodiments of the present invention.

What is claimed is:

1. An information push method comprising:
    receiving, by a Push server, a Push message delivered by an application server;
    obtaining, by the Push server, a private Internet Protocol (IP) address of a user equipment (UE) according to a user identifier, wherein the user identifier is obtained from the Push message;
    obtaining, according to the private IP address of the UE, a first packet switched (PS) domain node currently connected to the UE; and sending, by the Push server, the Push message to the first PS domain node such that the Push message is sent to the UE through the first PS domain node.

2. The method according to claim 1, wherein the user identifier comprises at least one of a static identifier and a dynamic identifier.

3. The method according to claim 2, wherein the static identifier is an identifier allocated by an operator to a user who subscribes to a Push service when the user subscribes to the Push service or when the user uses the Push service for a first time, and wherein the dynamic identifier is an identifier allocated by the Push server to the user dynamically according to a user's requirement every time when a Push client is registered with the Push server.

4. The method according to claim 1, wherein the first PS domain node is any one of a gateway GPRS support node (GGSN), a packet data network gateway (P-GW), a home agent (HA), an access service network gateway (ASN GW) and a packet data serving node (PDSN).

5. The method according to claim 1, wherein the private IP address of the UE is managed by the first PS domain node.

6. The method according to claim 1, wherein obtaining the private IP address of the UE according to the user identifier comprises a mapping between the user identifier and the private IP address of the UE.

7. The method according to claim 1, wherein obtaining, according to the private IP address of the UE, the first packet switched PS domain node currently connected to the UE comprises finding the first PS domain node currently connected to the UE according to a network segment to which the private IP address of the UE belongs.

8. An information push method comprising:
receiving a Push message delivered by an application server;
obtaining a user international mobile subscriber identity (IMSI) according to a user identifier, wherein the user IMSI is obtained from the Push message;
selecting a first packet switched (PS) domain node according to the user IMSI; and
sending the Push message and the user IMSI to the first PS domain node such that the Push message is sent to a user equipment (UE) through the first PS domain node.

9. The method according to claim 8, wherein obtaining the user IMSI according to the user identifier comprises a mapping between the user identifier and the user IMSI.

10. The method according to claim 8, wherein selecting the first PS domain node according to the user IMSI comprises:
sending, to a server that stores user information, a query message for querying network attachment information of the user IMSI;
obtaining a second PS domain node returned by the server that stores the user information;
selecting the first PS domain node capable of communicating with the second PS domain node or sending, to the server that stores user information, a query message for querying network attachment information of the IMSI;
adding an access point name (APN) of a Push server to the query message;
obtaining the first PS domain node determined according to the APN and returned by the server that stores the user information; and
selecting the returned first PS domain node or selecting the first PS domain node according to a preset rule using the APN of the Push server.

11. The method according to claim 8, wherein sending the Push message to the UE through the first PS domain node comprises:

receiving, by the first PS domain node comprising the Push message and the IMSI;
sending, by the first PS domain node, a query message that comprises the IMSI to a server that stores user information; and obtaining returned information, wherein the returned information comprises an address of a second PS domain node and a reason for terminal unreachability;
sending, by the first PS domain node, a protocol data unit notification request (PDU Notification Request) message to the second PS domain node, wherein a Packet Data Protocol (PDP) address in the PDU Notification Request message is a static PDP address of the UE, wherein the PDU Notification Request message is used by the second PS domain node to send the UE a request packet data protocol content activation Request PDP Context Activation message, wherein a PDP address in the Request PDP Context Activation message is the PDP address in the PDU Notification Request message, and wherein the Request PDP Context Activation message is used by the UE to initiate a PDP Context activation process and generate an available packet data protocol content PDP Context; and
sending, by the first PS domain node, the received data packet to the UE using the PDP Context.

12. The method according to claim 8, wherein sending the Push message to the UE through the first PS domain node comprises:
receiving, by the first PS domain node, a data packet comprising the Push message and the IMSI;
sending, by the first PS domain node, a query message that comprises the IMSI to a server that stores user information and obtaining returned information, wherein the returned information comprises an address of a second PS domain node or a reason for terminal unreachability;
sending, by the first PS domain node, a PDU Notification Request message to the second PS domain node, wherein a PDP address in the PDU Notification Request message is left blank, wherein the PDU Notification Request message is used by the second PS domain node to send the UE a Request PDP Context Activation message, which comprises a PDP type and a PDP address, wherein the PDP address in the Request PDP Context Activation message is the PDP address in the PDU Notification Request message, and wherein the Request PDP Context Activation message is used by the UE to initiate a PDP Context activation process, request a dynamic PDP address, and generate an available PDP Context; and
sending, by the first PS domain node, the received data packet to the UE using the PDP Context.

13. The method according to claim 8, wherein sending the Push message to the UE through the first PS domain node comprises:
receiving, by the first PS domain node, a data packet, comprising the Push message and the IMSI;
sending, by the first PS domain node, a query message comprising the IMSI to a server that stores user information and obtaining returned information, wherein the returned information comprises an address of a second PS domain node and a reason for terminal unreachability;
sending, by the first PS domain node, a PDU Notification Request message to the second PS domain node, wherein a PDP address in the PDU Notification Request message is allocated by the first PS domain node to the UE dynamically, wherein an indication field is added to indicate that the address is a newly-allocated address, wherein the PDU Notification Request message is used by the second PS domain node to send the UE a Request PDP Context Activation message, which comprises a PDP type, a PDP address, and an indication field, wherein the PDP address is the PDP address in the PDU Notification Request message, wherein the indication field is the indication field in the PDU Notification Request message, and wherein the Request PDP Context Activation message is used by the UE to initiate a PDP Context activation process, and to use the PDP address and the indication field in the Request PDP Context Activation message to generate an available PDP Context; and sending, by the first PS domain node, the received data packet to the UE using the PDP Context.

14. The method according to claim 8, wherein sending the Push message to the UE through the first PS domain node comprises:

receiving, by the first PS domain node, a data packet comprising the Push message and the IMSI;

sending, by the first PS domain node, a query message that comprises the IMSI to a server that stores user information, and obtaining returned information, wherein the returned information comprises an address of a second PS domain node and a reason for terminal unreachability;

sending, by the first PS domain node, a PDU Notification Request message to the second PS domain node, wherein a PDP address in the PDU Notification Request message is left blank, wherein an indication field is added to indicate that it is requested to initiate a PDP context activation procedure on a network side when no static IP address is available, wherein the PDU Notification Request message is used by the second PS domain node to send the UE a Request PDP Context Activation message, which comprises a PDP type, a PDP address, and an indication field, wherein the PDP address is the PDP address in the PDU Notification Request message, wherein the indication field is the indication field in the PDU Notification Request message, and wherein the Request PDP Context Activation message is used by the UE to initiate a PDP Context activation process, and to use the indication field in the Request PDP Context Activation message to request a dynamic PDP address and generate an available PDP Context; and sending, by the first PS domain node, the received data packet to the UE using the PDP Context.

15. A Push system comprising:

an application server configured to provide a specific application service and send a Push message;

a Push client;

a Push server; and a PS domain node configured to provide a service of connecting a user equipment (UE) to the Push server, and send the Push message to the UE, wherein the Push client is configured to
 run Push client software,
 initiate Push registration with the Push server, and
 when receiving the Push message sent by the application server, make a corresponding response according to presetting, wherein the Push server is configured to:
 determine, according to stored information of a user identifier, an application identifier, a mapping between the user identifier and a private IP address of the UE, and a mapping between the user identifier and a user IMSI;
 determine a corresponding PS domain node for the Push message sent by the application server; and
 send the Push message to the PS domain node.

* * * * *